United States Patent

[11] 3,577,780

[72] Inventor  Lawrence R. Sperberg
               6740 Fiesta Drive, El Paso, Tex. 79912
[21] Appl. No. 875,763
[22] Filed     Nov. 12, 1969
[45] Patented  May 4, 1971
               Continuation-in-part of application Ser. No.
               608,344, Jan. 10, 1967, now Patent No.
               3,478,581, dated Nov. 18, 1969.

[54] METHOD OF MEASURING TIRE UNIFORMITY
     7 Claims, 7 Drawing Figs.
[52] U.S. Cl. ............................................. 73/146
[51] Int. Cl. ....................................... G01m17/02
[50] Field of Search ................................. 73/146

[56]            References Cited
            UNITED STATES PATENTS
3,060,734  10/1962  Obarski et al. ................. 73/146
3,478,581  11/1969  Sperberg ....................... 73/146

*Primary Examiner*—Donald O. Woodiel

ABSTRACT: A tire uniformity machine having means for rotatably mounting a pneumatic tire and a test wheel on an elongated frame and wherein the outer periphery of the test wheel is held adjacent the outer periphery of the tire with a predetermined pressure. The elongated frame is hinged on each side and provided with axially rotatable means to enable the test wheel to be aligned with the buttress area or sidewall of the tire, in addition to the conventional location adjacent the tread. The test wheel is provided with strain gauges and the diameter of the test wheel with respect to the diameter of the tire is held between the limits of 1:30 and 1:4, with the ratio of 1:16 being ideal or optimum.

Patented May 4, 1971
3,577,780
2 Sheets-Sheet 1
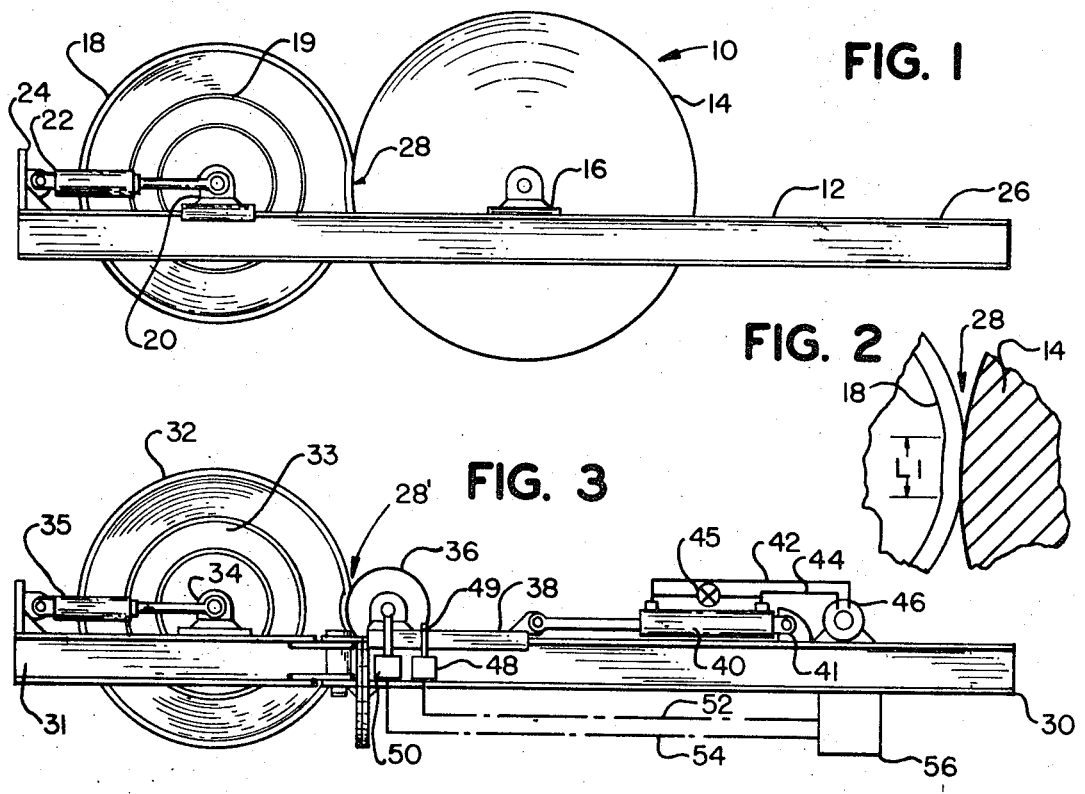
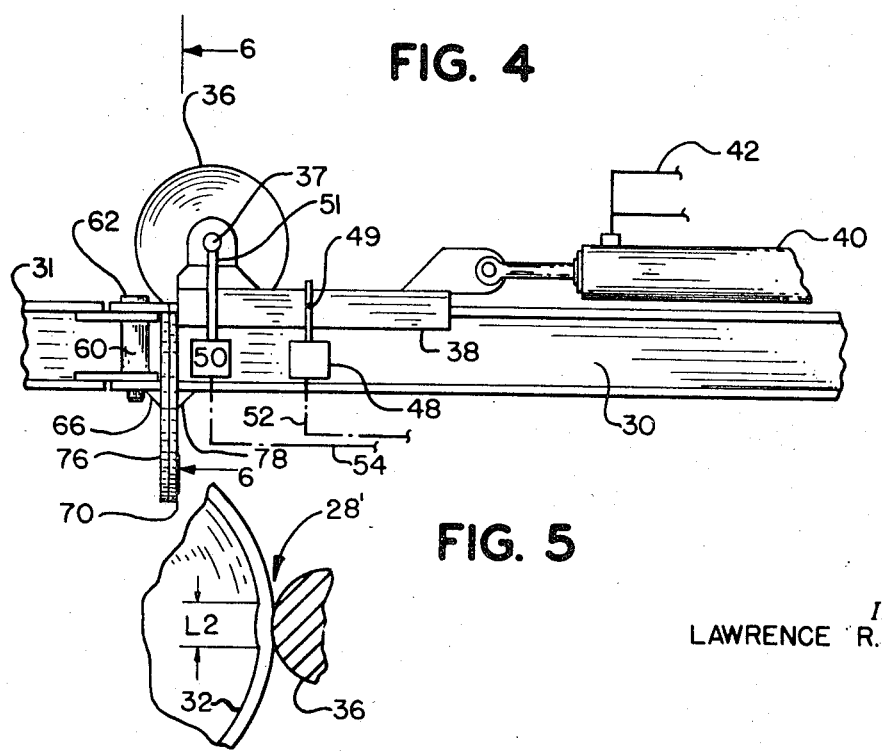
INVENTOR.
LAWRENCE R. SPERBERG Patented May 4, 1971

INVENTOR.
LAWRENCE R. SPERBERG

METHOD OF MEASURING TIRE UNIFORMITY

CROSS-REFERENCES TO RELATED APPLICATIONS

Ser. No. 608,344, filed Jan. 10, 1967, now U.S. Pat. No. 3,478,581 issued Nov. 18, 1969, of which this application is a continuation in part.

BACKGROUND OF THE INVENTION

As a tire rotates through its 360° circumference, the contact area between the tire and the road surface is subjected to a finite degree of force changes dependent upon the degree of imperfectness of the tire. This degree of imperfectness has been characterized as lateral force variation, radial force variation, and the conicity effect. The magnitude of these force variations the rate of wear of the tread surface of the tire, as well as the tire durability.

It is advantageous, especially in tire testing, to establish the magnitude of these force variations so as to enable the experimenter to predict the true wear capability of a tire as well as the true durability of the tire, since the presence of these force variations detract from the wear rate and durability of a tire.

Many tire imperfections occur at the buttress area in the sidewall because of improper placement or assembly of the tire cord material with respect to the equatorial plane of the tire. Some imperfections occur as a result of "overlap" of the free ends of the cord material; and other imperfections are due to the free ends of the cord being spaced apart from one another. Still other imperfections can be attributed to a "loose" cord fiber, that is, a portion of the cord material may not be as tight as the remaining cord material. There are other imperfections that cause nonuniformity to exist in tires, which can also be measured as force variations that occur in each sidewall as well as the tread portion that contacts the ground.

Various machines are known that measure lateral and radial force variations. These machines are generally referred to as "tire uniformity machines." Tire uniformity machines have heretofore been employed by industry to measure the degree of imperfections, or nonuniformity, to thereby determine the riding comfort that may be expected from a particular tire. Accordingly, tire uniformity machines of the past art have employed a large test wheel that is generally placed adjacent the tread surface of the tire that is to be evaluated, and the tire rotated through its circumferential 360° whereby strain gauges associated with the large test wheel or tire may accordingly determine the force variation in the radial and lateral directions that is exerted by the tread surface of the tire as it comes into contact with the large test wheel. This method and means of establishing lateral and radial force variation, while limited to the tread surface, has proven satisfactory as a quality control means associated with the esthetics of the tire, since the results obtained therefrom may be related to the riding comfort of a vehicle.

In my parent copending patent application, Ser. No. 578,707, filed Sept. 12, 1966, it is pointed out that a tire will fail at its point of maximum force variation, or at the point of maximum change of the force variation. Furthermore, the maximum rate of wear will occur where the rate of change in the force variation is at a maximum. It is therefore desirable to provide a tire uniformity machine that enables the experimenter to determine the precise location of imperfections in a tire, including imperfections that may occur in the sidewall. Since the tire uniformity machines of the past art use large test wheels associated with strain gauges for determining tire nonuniformity, they are not suitable for pinpointing imperfections contained in the tire since the large contact area between the rotating tire and the rotating test wheel tends to average out the magnitude and locality of the imperfections. Furthermore, uniformity machines of the prior art fail to provide a method of determining the force variations associated with the sidewalls of the tire, and accordingly, the data that is obtained from a conventional tire uniformity machine provides an incomplete picture of the actual location and magnitude of the defects contained within the tire.

SUMMARY OF THE INVENTION

The tire uniformity machine of the present invention employs a test wheel that enables the contact area between the tread surface of the tire that is in contact with the test wheel to be reduced to a minimum to thereby enable measurement of existing imperfections at the precise point of occurrence. This expedient provides the tire tester with means to precisely calculate the effect that the imperfections or tire nonuniformity will have upon a tire during a testing program. The tire uniformity machine further provides a means by which the test wheel may be positioned adjacent the sidewalls and adjusted axially with respect to the longitudinal axis of the test frame so as to provide exact alignment between the test wheel and sidewall of the tire to thereby enable analysis of the sidewall structure to be carried out, in addition to analysis of the tread surface of the tire.

It is therefore an object of this invention to provide an improved method by which the imperfections existent within a tire may be precisely determined.

Another object of this invention is to provide a means by which the magnitude and location of defects in a tire may be exactly located with respect to the 360° circumference of the tire.

Another object of this invention is to provide an apparatus which greatly reduces the contact area between a tire and a test wheel for purposes of determining tire nonuniformity.

A still further object of this invention is to provide a method of analyzing the imperfections that exist in the sidewall of a pneumatic tire.

The above objects are attained in accordance with the present invention by the provision of a method related to determining the force variations existent throughout the 360° circumferential area of the tire, including the tread surface and each sidewall. In carrying thin invention into practice, a new apparatus is s necessarily presented in order to explain one means by which the present method may be practiced.

BRIEF DESCRIPTION OF THE DRAWING

FIG. 1 is a side view which diagrammatically sets forth a prior art tire nonuniformity testing machine;

FIG. 2 is an enlarged fragmentary diagrammatical representation of the prior art test wheel and tire of FIG. 1;

FIG. 3 is a diagrammatical representation of a side view of a tire nonuniformity machine made in accordance with the teachings of the present invention;

FIG. 4 is a fragmentary diagrammatical representation of the test wheel seen in FIG. 3;

FIG. 5 is a fragmentary representation illustrating the interface between a test wheel and a tire associated with the present invention;

BRIEF DESCRIPTION OF THE PREFERRED EMBODIMENT

Figure 6:
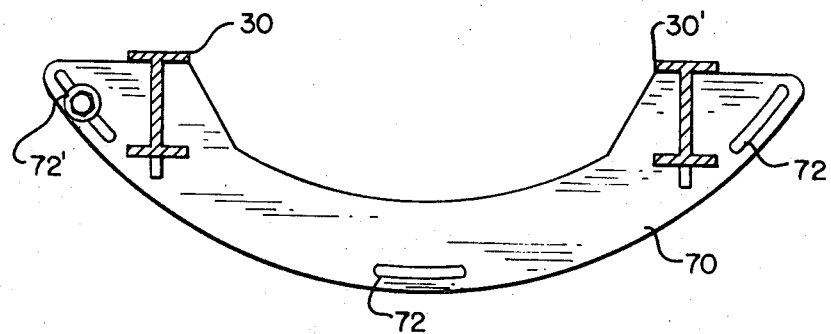
FIG. 6 is an enlarged cross-sectional view taken along line 6–6 of FIG. 4.

Looking now to the details of FIGS. 1 and 2, wherein there is seen a prior art tire nonuniformity measuring machine, also referred to herein as a tire uniformity machine, generally illustrated by the arrow at numeral 10. A reinforced built-up framework 12 supports a test wheel 14 which is suitably journaled to the frame at 16. A pneumatic tire 18, which is inflated and mounted on a conventional vehicle wheel 19, is suitably journaled in slidable relationship with the frame, as indicated by numeral 20. A hydraulic cylinder 22 is pivotally mounted to the journal 20 and connected to an upstanding support member 24 so as to enable the tire 18 to be placed against the wheel 14 with a predetermined pressure to therefore regulate the force at interface 28. The force exerted by the hydraulic cylinder 22 is generally of the order of 1,000 pounds for an 8.25–14 tire.

FIG. 2 is a diagrammatical cross-sectional view generally illustrating the contact area 28, wherein the pneumatic tire 18 is forced against the prior art test wheel 14.

Looking now to the details of FIG. 3, in conjunction with the remaining FIGS. there is seen illustrated therein a built-up reinforced framework comprised of two components, 30 and 31, that are suitably hinged together with frame 31 supporting an inflated pneumatic tire 32 which is mounted on a conventional vehicle wheel 33. The wheel is journaled to the framework by the slidable member as indicated by numeral 34. Hydraulic cylinder 35 slides member 34 longitudinally of frame 31 to thereby permit large adjustments between the journaled slidable members 34 and 37, and especially to extend the tire into the position of FIG. 7. A test wheel 36, preferably an elongated metal cylinder 1¾ inches in diameter, is suitably journaled to member 38 which is mounted in sliding relationship to frame 30. While 1¾ inches is considered optimum for an 8.25-14 tire, it should be understood that a ratio of diameters anywhere from 1:4 to 1:30 is contemplated by the invention. While other test wheels may be used with the present invention, the sizes stated above are preferred. A hydraulic cylinder 40, having a piston rod associated therewith, is pivotally connected to the slidable journaled member 38. The cylinder body is rigidly affixed to the framework in a pivotal manner as indicated by the numeral 41. Hydraulic flow lines 42 and 44, including the bypass valve 45, are connected between the hydraulic cylinder and the hydraulic pump 46, in a manner to provide a source of fluid pressure to the cylinder.

The test wheel is provided with a sensitive strain gauge 50 which is rigidly affixed to the framework 30 and connected to sense movement of the laterally slidable axle of the wheel by means of linkage 51. Movement, or changes in force, of the axle of the test wheel 36 in a lateral direction is sensed by the strain gauge 50. A second strain gauge 48 is suitably affixed to sense movement of the test wheel by means of the linkage 49. A predetermined force is maintained against the tire by the linkage 49 which bears against member 38 and measures force changes in a radial direction. Electrical conductors 52 and 54 convey the impulses from the strain gauges to a conventional recorder 56 to thereby enable a permanent record to be made of the lateral and radial force variations that occur about the 360° circumference of a tire.

Frame members 30 and 31 are hinged together by the indicated massive hinge assembly 60 and 61. Each hinge includes a removable hinge pin 62 and reinforcing web 66. Each frame member 30 and 31 is provided with the illustrated hinge assembly to thereby allow the test wheel to be positioned adjacent either of the sidewalls as well as the tread of the tire. Near the hinge assembly, there is provided complementary plate members 70 and 76 which provide means for longitudinal axial rotation of the frame 30 with respect to the frame 31.

Plate member 76 is rigidly attached to frame 31 while plate member 70 is rigidly attached to frame member 30. Elongated arcuate slots, as seen at 72, are provided at the marginal edge portion of each plate, through which a multiplicity of fasteners 72' extend to thereby rigidly lock the plates together.

Figure 7:
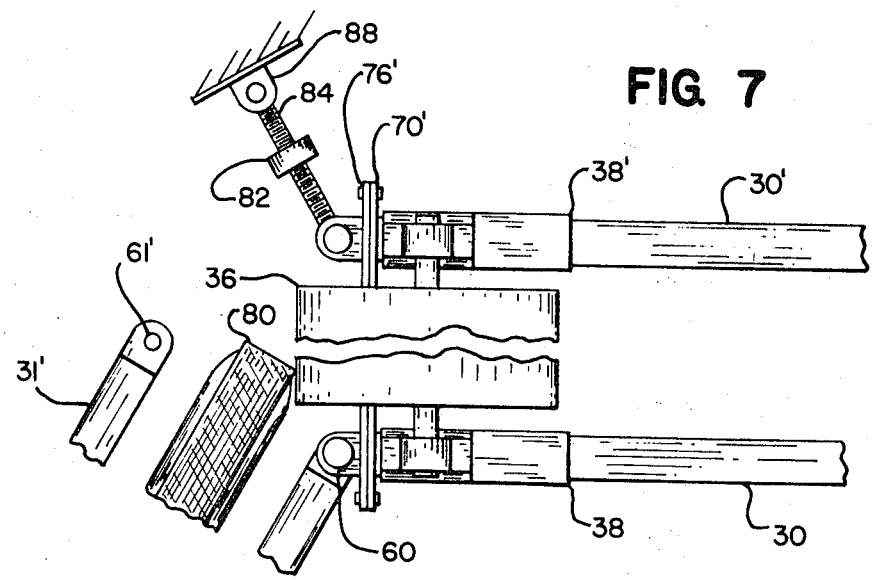
FIG. 7 is an enlarged fragmentary top view of the device seen in FIGS. 3 and 4.

Upon frames 30 and 31 being hinged apart in either direction in the illustrated manner of FIG. 7, it is desirable to provide the device with an adjustable stop means comprised of turnbuckle 82, 84 that may be conveniently attached between opened hinge 61' and a stationary lug 88. Alternatively, the turnbuckle may be placed between the depending ends of the spaced apart or opened hinge ends.

OPERATION

The operation of the embodiment illustrated in FIGS. 3, 4, 6, and 7 is preferably carried out by mounting a pneumatic tire 32 upon a conventional vehicle wheel 33. Where the vehicle tire 32 is an 8.25-14, the circumference is generally of the order of 90 inches. After the mounted tire 32 is suitably mounted to the wheel in journaled relationship at 34, the test wheel 36, having a diameter of 1¾ inches, is forced against the tire 32 by the cylinder 40 with a predetermined amount of pressure at the contact area 28'. The strain gauges are connected in the illustrated manner and the tire 32 is then rotated 360° in each direction. The results of the influence of the rotation of the tire upon the strain gauges 48 and 50 are recorded as force variations upon a strip chart at 56.

Since the contact area at 28' along the length L2 of FIG. 5 is controlled by the size of the test wheel 36 of FIG. 3, it is evident that the contact area is proportional to the diameter of the test wheel. A diameter of 1¾ inches greatly reduces the contact area between the tire and the test wheel, and accordingly, the forces measured by the strain gauges will indicate measurements taken along a small segment of the tire surface, compared to the prior art illustration of FIG. 2.

After determining the force variation of the tread surface, which is carried out in the illustrated manner of FIG. 3, the force variation is then determined along the buttress area of each sidewall of the tire. This expedient is carried out by unhinging one side of the frame which is accomplished by removing one of the pins 60 to thereby enable the frame 30 to be pivotally rotated away from the frame 31 in the illustrated manner of FIG. 7. After one member has been pivoted away from the remaining frame member, each frame member is maintained in rigid relationship to the other by means of the turnbuckle at 82 and 84. The tire 80 of FIG. 7 is moved forward by hydraulic cylinder 35 until the buttress area of the sidewall is in intimate contact with the test wheel 36. Plate member 70 and 76 enable frame 30 to be rotated along its longitudinal axis to thereby enable any alignment desired between test wheel 36 and the buttress area of the sidewall of the tire 80. After ascertaining the dynamic flexibilities existent in the sidewall of tire 80, the tire is retracted and the pin replaced in the unfastened hinge. The opposite hinge is opened in a manner similar to the above discussion to thereby enable determination of the dynamic flexibilities existent in the remaining sidewall of the tire.

It should be understood that while FIG. 7 illustrates the outside marginal edge portion of the tread surface contacting the wheel 36, that the tire 80 may be positioned whereby any outer portion thereof is placed adjacent the test wheel 36 by merely adjusting the angle or amount that the spaced apart hinge is allowed to open, and thereafter positioning tire 80 with respect to test wheel 36 by means of hydraulic cylinder 35. Test wheel 36 can then be brought into perfect aligned relationship with the rolling tire by means of adjustable plates 70 and 76. Since most failures occur in the buttress area of a tire, for the reason that maximum flexing occurs therein, it will generally be desired to closely scrutinize this area for its dynamic flexibility characteristics.

The above means of rapidly evaluating the uniformity of a tire also finds utility in grading tires according to their imperfectness. For example, where a tire fails to qualify as a superior grade of tire because of an irregularity in a radial direction, the tire may be made true, or less imperfect, by removing a portion of the tread stock in a lathing operation, thereby lowering the magnitude of the radial force variation. This is especially so where the imperfectness is attributed to a "bunching up" or improperly distributed tread stock.

As stated above, it has been found advantageous to use a 1¾-inch diameter test wheel 36 in conjunction with an 8.25-14 tire. Since an 8.25-14 tire has a circumference of approximately 90 inches, and since the 1¾-inch diameter test wheel has a circumference of 5½ inches, the ratio between the circumference of the tire and the circumference of the test wheel is about 16 to 1. Test wheels smaller than 1 inch in diameter have been found to be unsatisfactory because the amount of pressure at interface 28' required to simulate a normal load condition must be considerably reduced to prevent the wheel from becoming unduly embedded within the pneumatic tire at the contact area. Test wheels larger than 7 inches in diameter spread the contact length L2 over a greater area, and accordingly, reduces the accuracy of the results that are recorded on the chart by the recorder 56. Therefore the ratio of 16 to 1 has been found desirable in carrying out this invention. Should it be desired to test a 20-inch truck tire, for example, then the test wheel 36 must be selected in accordance with the ratio of 16 to 1.

The invention in its broader aspects is not limited to the specific mechanism or structure shown and described but departures may be made therefrom within the scope of the accompanying claims without departing from the principles of the invention and without sacrificing its chief advantages.

I claim:

1. A method of determining tire uniformity with a tire uniformity measuring apparatus having means for measuring force variations associated therewith comprising the steps of:
   1. measuring the force variations exerted by the 360° circumferential surface of a tire tread;
   2. measuring the force variations exerted by the 360° circumferential surface of the sidewall of a tire;
   3. comparing the data obtained in step (1) with the data obtained in step (2) to determine the structural integrity of the tire.

2. The method of claim 1, and further including
   4. the force variation of step (1) is measured in a radial and lateral direction with respect to the equatorial plane of the tire; and
   5. the force variation of step (2) is measured in a radial and lateral direction with respect to a perpendicular plane that is perpendicular to the buttress area of the sidewall of the tire.

3. The method of claim 1, wherein the act of measuring in steps (1) and (2) is carried out by applying a rotational load to the tire, while simultaneously measuring the change in the load as the tire is being rotated 360° about its central axis.

4. The method of claim 1, wherein the determination of force variations is carried out by:
   4. placing the means for measuring the tire uniformity against the tread surface of the tire in order to carry out step (1), and
   5. placing the means for measuring the tire uniformity against the sidewall of the tire in order to carry out step (2).

5. The method of claim 4, wherein:
   6. steps (4) and (5) are measured by using the same means for measuring the tire uniformity.

6. The method of claim 5, wherein the means for measuring the tire uniformity includes the step of:
   placing a rotatable wheel against the rotating tire and measuring the movements of the rotatable wheel by using strain gauges.

7. The method of claim 1, wherein the means for measuring the tire uniformity includes the step of:
   placing a rotatable wheel against the rotating tire and measuring the movements of the rotatable wheel by using strain gauges.